United States Patent [19]

Low et al.

[11] Patent Number: 4,509,062

[45] Date of Patent: Apr. 2, 1985

[54] INK RESERVOIR WITH ESSENTIALLY CONSTANT NEGATIVE BACK PRESSURE

[75] Inventors: Robert N. Low; Frank L. Cloutier, Corvallis; Gary Siewell, Albany, all of Oreg.

[73] Assignee: Hewlett-Packard Company, Palo Alto, Calif.

[21] Appl. No.: 443,973

[22] Filed: Nov. 23, 1982

[51] Int. Cl.[3] .......... G01D 15/16

[52] U.S. Cl. .......... 346/140 R; 400/126

[58] Field of Search .......... 346/140 PD, 140 R, 140 A, 346/75; 200/83 A, 83 B; 400/126

[56] References Cited

U.S. PATENT DOCUMENTS 2,704,551 3/1955 Ralston .......... 200/83 B
4,412,232 10/1983 Weber .......... 346/140 PD
4,422,084 12/1983 Saito .......... 346/140 PD

OTHER PUBLICATIONS

Brady *Materials Handbook*, pp. 643, 644, 686, 9th ed.

*Primary Examiner*—E. A. Goldberg
*Assistant Examiner*—Mark Reinhart
*Attorney, Agent, or Firm*—Jeffery B. Fromm

[57] ABSTRACT

An ink reservoir which incorporates a negative back pressure source coupled to a membrane wall of the reservoir to prevent ink leakage from a reservoir orifice is disclosed. The back pressure is created by either a linear or nonlinear spring which can be either independent of, or integral with, the membrane. The result is freedom from ink leakage and improved quality printing when the reservoir is used in conjunction with an ink pen such as used in ink jet printing.

8 Claims, 8 Drawing Figures

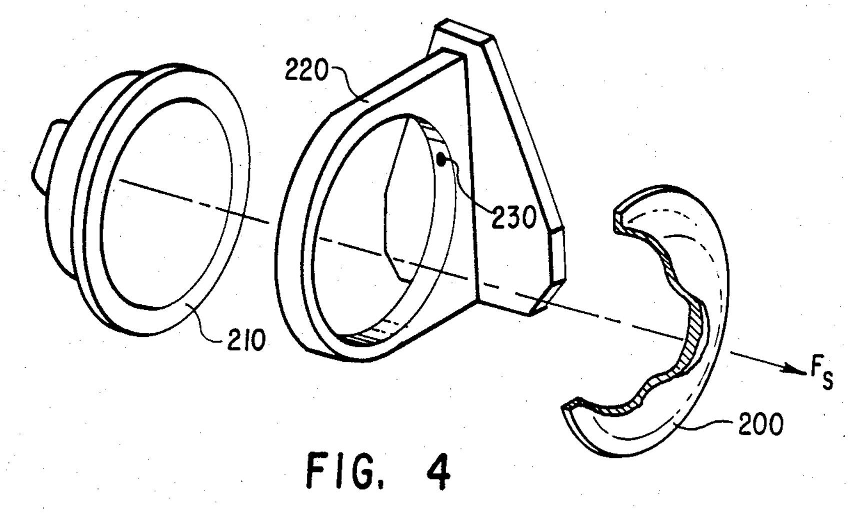
FIG. 4
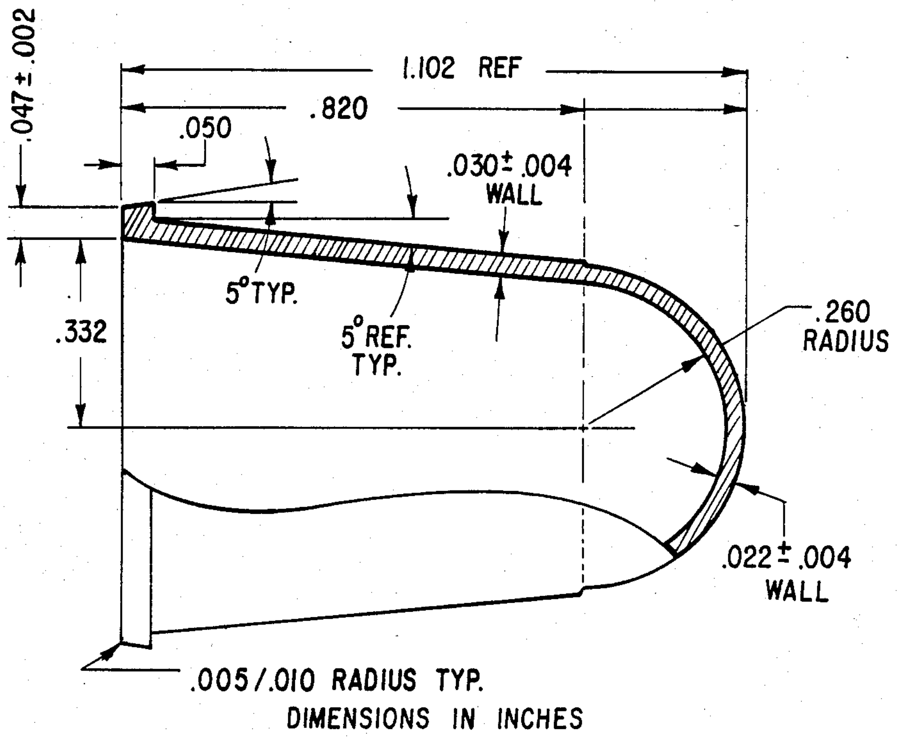
FIG. 5A
FIG. 5B
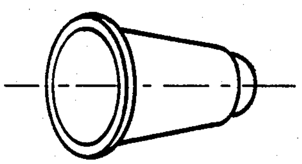

INK RESERVOIR WITH ESSENTIALLY CONSTANT NEGATIVE BACK PRESSURE

BACKGROUND OF THE INVENTION

It has been shown previously that it is important to supply a static negative pressure (or head) at the orifices of an ink jet to enhance print quality. By doing so, a negative meniscus draws any ink at the orifices back into the pen, and provides a cleaner, more uniform ejection surface.

In a portable or disposable pen, the importance of a negative head is even more important, because the ink must be contained even in transit, at any altitude, and unde shock and vibration. In the case of a portable disposable pen, the only mechanisms holding the ink into the pen when the orifices are face down in the vertical direction are surface energy related.

As shown in FIG. 1A, the pressure P1 exerted on the liquid 10 in the reservoir 20 by the orifice 30 is related to the radius of curvature, r1, and the surface energy of the fluid $\gamma$. Thus $P1=2\gamma/rl$. The pressure Pa exerted by the fluid due to an external acceleration such as gravity or external shock is related to the fluid density $\pi$, head height h, and acceleration a. Thus $Pa=\pi ah$. If the orifice diameter D is small enough, an equilibrium condition will be achieved such that ink will not flow from the orifices. If the orifice plate wets well in this attitude, the contact angle $\phi 1$ of the fluid, on the orifice surface will be insufficient to exert sufficient pressure P2 to sustain Pa as shown in FIG. 1B. Thus $P2=2\gamma/r2<P1$.

The prior art suggests that an antiwett coating should be applied around the orifice, to increase the contact angle $\phi 2$, as shown in FIG. 1C, thus increasing the capillary pressure. In practice this approach has two major drawbacks. First, due to a sudden shock (increased a), a blob of ink will emerge which may have sufficient radius r to overcome the equilibrium condition. Second, and more importantly, most antiwet compounds are attacked by the dye in the ink since an important quality of a dye is that it chemically bonds itself to a surface. This poisons the antiwet coating and drops the contact angle back to a low value.

Another way to contain the ink in the reservoir includes valves, which however are large, clumsy and expensive.

SUMMARY OF THE INVENTION

The solution according to the present invention for a portable disposable inkjet pen is to mechanically cause a constant negative pressure slightly greater than the maximum hydrostatic head. One solution according to the present invention is to use a spring to exert a force against a bladder membrane which draws back on the ink. The back pressure or suction must however remain relatively constant, because below a back pressure equal to the pressure exerted by external accelerations ($\pi$ah) under some conditions the pen will lose ink, and yet above some critical value, the print quality deteriorates. Therefore, standard linear springs are only suitable for use over a reasonable change of ink volume if a thin reservoir (i.e., small h) is used.

In order to permit the use of more generalized reservoir shapes, the present invention also discloses the use of a nonlinear spring exerting a force on a bladder mechanism which draws back on the ink with a constant pressure across a wide range of deflections.

Whether a linear or nonlinear spring is used, the spring may be incorporated as part of the bladder membrane itself to further minimize cost and size. Thus, the bladder membrane can be made of a spring material such as silicone rubber, removing the need for connectors and supports required to construct a system in which a separate spring is coupled to a separate membrane.

BRIEF DESCRIPTION OF THE DRAWING

FIG. 4 shows a pictorial view of an apparatus according to a preferred embodiment of the present invention.

FIGS. 5A and 5B show a cross sectional and pictorial view respectively of a Belleville-like membrane dome for use in the invention as shown in FIG. 4.

DETAILED DESCRIPTION OF THE INVENTION

Figure 1A:
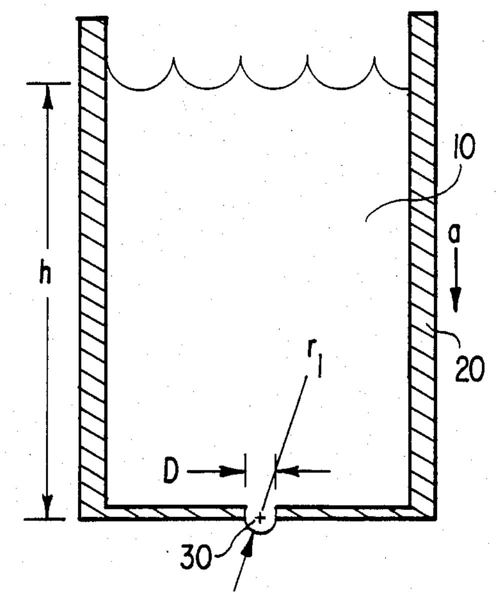
FIGS. 1A, 1B, and 1C show a cross sectional view and the three cases of ink drips according to the prior art.
Figure 1B:
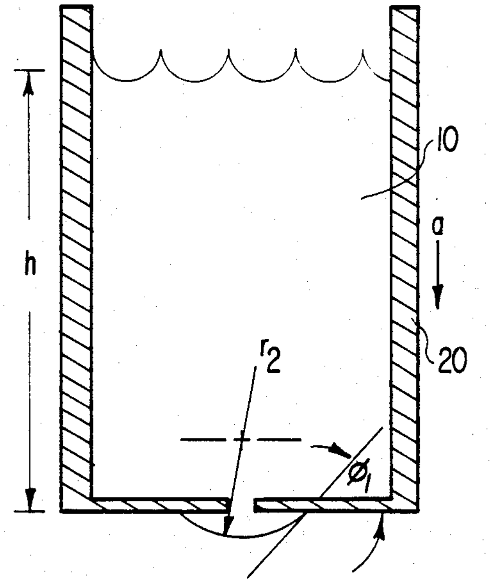
Figure 1C:
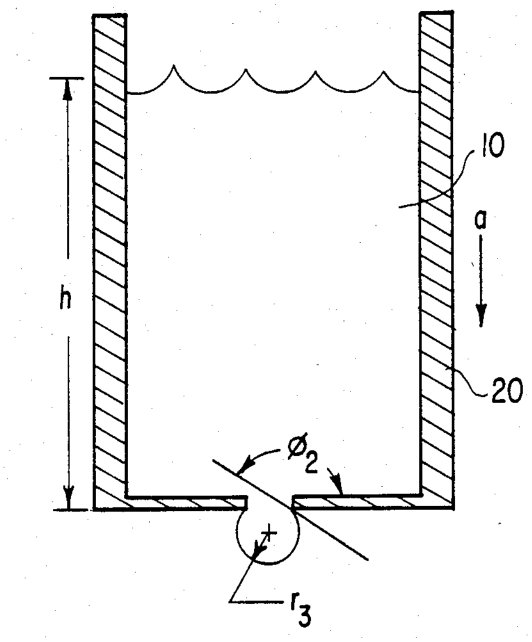
Figure 2:
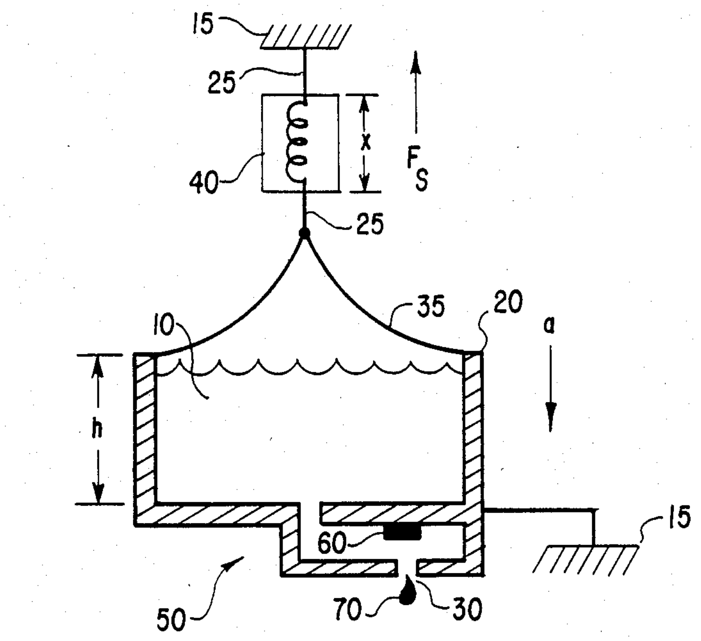
FIG. 2 shows a block diagram of an apparatus according to a preferred embodiment of the present invention.

FIG. 2 shows a block diagram of an embodiment of the present invention. A spring 40 coupled to a foundation 15 is used to pull back on a membrane bladder 35 by means of linkage 25. The bladder 35 serves to cap pen 50 and reservoir 20 containing ink 10 filled to a height h. The reservoir 20 is also held motionless relative to the foundation 15. The pen 50 has an orifice 30 pointing in the direction of an external acceleration a. Adjacent to the orifice 30 is a firing means 60, such as a thermal ink jet resistor, which is used to expel droplets 70 of ink 10 through the orifice 30.

With such a configuration, the bladder 35 should be a flexible nonporous material such as polyethylene, cellophane, or vinyl so that the force Fs of the spring 40 can be transferred directly to the ink 10. The spring can be conventional coiled spring with Fs=4 grams for a reservoir 20 with ink 10 having a surface energy $\gamma=40$ ergs/sq. cm, and density $\pi=1.18$ gm/cubic centimeters, and an orifice of radius $r=40$–80 microns. Because of the spring force Fs acting against the acceleration pressure Pa no substantial quantities of ink 10 will be expelled from orifice 30 except under the influence of the firing means 60.

The spring 40 and bladder 35 can be combined into a single unit by using an elastomeric bladder, for example made of silicone rubber or other natural or synthetic rubbers with sufficient chemical resistance to the ink 10, which can create the spring force Fs directly. Such an integrated bladder 35 and spring 40 simplifies the construction of the reservoir system by eliminating the need for the separate linkage 25 and the separate spring 40 which must be made of very fine gauge wire so that Fs=4 grams.

The major disadvantage of such a configuration is that the spring force Fs of a conventional spring is proportional to its extension x. Thus $dFs=K^*dx$. Hence as the ink 10 is expelled from the reservoir 20, the height h of the ink decreases and the spring length x increases and Fs increases, thus changing the shape and size of the ink droplets 70 and the print quality. This effect can be minimized if the change in height h is made small by using a reservoir 20 that is very thin (i.e., h is small) while still having a desired volume V.

Figure 3:
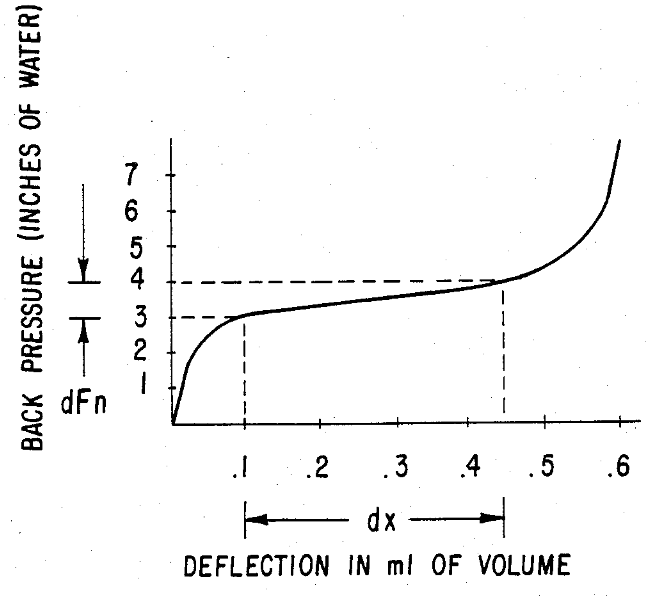
FIG. 3 shows a force-deflection curve for a spring for use in the invention as shown in FIG. 2.

A more useful approach is to use a non-linear spring 40 so that the spring force Fs is relatively constant over the maximum change of height h. Such non-linear springs, as for example a Belleville spring, have a force-deflection curve as shown in FIG. 3. As long as the change in force dFn across the usable deflection range dx of the spring 40 is greater that or equal to the maximum change in ink height h an approximately constant back pressure force Fs will be produced which prevents leakage out of orifice 30 due to external accelerations a and enhances print quality.

The non-linear Belleville-like spring approach can also be used as shown in FIGS. 4, 5A and 5B to create an integrated bladder and spring to provide the desired constant back pressure force Fs. In FIG. 4, a silicone rubber dome 200, and a solid ink reservoir 210 are coupled to a housing 220 with an orifice 230 which leads to a convention jet printing head (not shown).

Many shapes may be employed to create the dome 200 to achieve a constant back pressure force Fs as long as there are several spring bending moments which cancel each other across the desirable range of deflection dx. FIGS. 5A and 5B show a cross sectional and pictorial view respectively of one such Belleville-like bladder dome 200.

We claim:

1. A reservoir for holding a liquid for a liquid jet apparatus, said reservoir comprising:

a support structure;

a bladder supported by said support structure; and first means coupled to said support structure and said bladder for providing a negative pressure force to said liquid in said reservoir, said first means comprising a non-linear spring having an essentially constant spring force over a change in position of said bladder as the liquid in said reservoir goes from full to empty.

2. A reservoir as in claim 1 wherein said non-linear spring comprises a dished spring.

3. A reservoir as in claim 1 wherein said bladder consists essentially of a flexible non-porous material.

4. A reservoir for holding a liquid for a liquid jet apparatus, said reservoir comprising:

a support structure; and second means coupled to said support structure for providing a negative pressure force to said liquid in said reservoir, said second means comprising an elastic material configured to have an essentially constant spring force as said second means changes position as the liquid in said reservoir goes from full to empty.

5. A reservoir as in claim 4 wherein said second means comprises a bladder.

6. A reservoir as in claim 5 wherein said bladder consists essentially of rubber.

7. A reservoir as in claim 4 wherein said second means comprises a dished spring.

8. A reservoir as in claim 5 wherein said bladder consists essentially of silicone rubber.

* * * * *